United States Patent
Groves et al.

(10) Patent No.: US 12,496,290 B2
(45) Date of Patent: Dec. 16, 2025

(54) METHOD AND COMPOUNDS FOR TREATING OR PREVENTING AUTOIMMUNE DISORDERS OR IMMUNE RESPONSES MODULATED BY THE EXPRESSION OF IDO1

(71) Applicant: The Trustees of Princeton University, Princeton, NJ (US)

(72) Inventors: John T. Groves, Princeton, NJ (US); Micah T. Nelp, Plainsboro, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 916 days.

(21) Appl. No.: 17/625,208

(22) PCT Filed: Jul. 10, 2020

(86) PCT No.: PCT/US2020/041618
§ 371 (c)(1),
(2) Date: Jan. 6, 2022

(87) PCT Pub. No.: WO2021/007521
PCT Pub. Date: Jan. 14, 2021

(65) Prior Publication Data
US 2022/0288021 A1 Sep. 15, 2022

Related U.S. Application Data

(60) Provisional application No. 62/872,303, filed on Jul. 10, 2019.

(51) Int. Cl.
*A61K 31/404* (2006.01)
*A61K 47/18* (2017.01)

(52) U.S. Cl.
CPC .......... *A61K 31/404* (2013.01); *A61K 47/183* (2013.01)

(58) Field of Classification Search
CPC .................................................. A61K 31/404
See application file for complete search history.

(56) References Cited

U.S. PATENT DOCUMENTS

2017/0107178 A1   4/2017   Cowley et al.

OTHER PUBLICATIONS

Bostelaar, et al., "Hydrogen Sulfide Oxidation by Myoglobin", Journal of the American Chemical Society, vol. 138, No. 27, Jun. 16, 2016, 8476-8488.
Filipovic, et al., "Chemical Biology of H2S Signaling through Persulfidation", Chemical Reviews, vol. 118, No. 3, Nov. 7, 2017, 1253-1337.
Fukuto, et al., "Biological Hydropersulfides and Related Polysulfides— a New Concept and Perspective in Redox Biology", vol. 592, No. 12, FEBS Letters, May 2018, 2140-2152.
Jensen, et al., "Reactions of Ferric Hemoglobin and Myoglobin with Hydrogen Sulfide Under Physiological Conditions", Journal of Inorganic Biochemistry, vol. 182, Feb. 10, 2018, 133-140.
Kimura, et al., "Polysulfides are Possible H2S-Derived Signaling Molecules in Rat Brain", The FASEB Journal, vol. 27, No. 6, Jun. 2013, 2451-2457.
Koike, et al., "Analysis of Endogenous H2S and H2Sn in Mouse Brain by High-Performance Liquid Chromatography with Fluorescence and Tandem Mass Spectrometric Detection", Free Radical Biology and Medicine, vol. 113, Oct. 18, 2017, 355-362.
Kolawole, et al., "Catalytic Activity of Human Indoleamine 2,3-Dioxygenase (hIDO1) at Low Oxygen", Archives of Biochemistry and Biophysics, vol. 570, Feb. 21, 2015, 47-57.
Matsui, et al., "Hydrogen Sulfide Bypasses the Rate-Limiting Oxygen Activation of Heme Oxygenase", Journal of Biological Chemistry, vol. 293, No. 43, Sep. 20, 2018, 16931-16939.
Mishanina, et al., "Biogenesis of Reactive Sulfur Species for Signaling by Hydrogen Sulfide Oxidation Pathways", Nature Chemical Biology, vol. 11, No. 7, Jun. 17, 2015, 457-464.
Mittra, et al., "Mechanism of Reduction of Ferric Porphyrins by Sulfide: Identification of a Low Spin FeIII-SH Intermediate", Inorganic Chemistry, vol. 56, No. 7, Mar. 15, 2017, 3916-3925.
Vitvitsky, et al., "Cytochrome c Reduction by H2S Potentiates Sulfide Signaling", ACS Chemical Biology, vol. 13, No. 8, Aug. 17, 2018, 2300-2307.
Vitvitsky, et al., "Structural and Mechanistic Insights into Hemoglobin-catalyzed Hydrogen Sulfide Oxidation and the Fate of Polysulfide Products", Journal of Biological Chemistry, vol. 292, No. 13, Feb. 17, 2017, 5584-5592.
Vitvitsky, et al., "Sulfide Oxidation by a Noncanonical Pathway in Red Blood Cells Generates Thiosulfate and Polysulfides", Journal of Biological Chemistry, vol. 290, No. 13, Feb. 16, 2015, 8310-8320.
Vottero, et al., "Cytochrome b5 Is a Major Reductant in Vivo of Human Indoleamine 2,3-Dioxygenase Expressed in Yeast", FEBS Letters, vol. 580, No. 9, Mar. 20, 2006, 2265-2268.
International Search Report and Written Opinion for corresponding PCT Application No. PCT/S2020/041618, dated Oct. 7, 2020.
PubChem CID 135201172 Create Date: Dec. 15, 2018.
PubChem CID 130010504 Create Date: Oct. 7, 2017.
Dragovich et al., "Conjugation of Indoles to Antibodies through a Novel Self-Immolating Linker", Chemistry a European Journal. vol 24, pp. 4830-4834, Apr. 3, 2018.
Boubeta et al., "Mechanism of Sulfide Binding by Ferric Hemeproteins", Inorganic Chemistry, vol. 57, pp. 7591-7600, Jun. 19, 2018.
Maghzal et al., "Cytochrome b5, Not Superoxide Anion Radical, Is a Major Reductant or Indoleamine 2.3-Dioxygenase in Human Cells", The Journal of Biological Chemistry, vol. 283, No. 18, pp. 12014-12025, Feb. 25, 2008.

(Continued)

*Primary Examiner* — Golam M Shameem
(74) *Attorney, Agent, or Firm* — Meagher Emanuel Laks Goldberg & Liao, LLP (57) ABSTRACT

A method and compositions of matter for treating or preventing an auto-immune disorder or immune response in a patient, that includes providing a therapeutic dose to the patient of a substituted indole compound having at least one substitution, wherein the substituted indole compound has only one thiol group, and wherein the ring the thiol group is attached to only contains one N or O atom.

9 Claims, 6 Drawing Sheets

(56) References Cited

OTHER PUBLICATIONS

Benchoam et al., "Hydrogen Sulfide and Persulfides Oxidation by Biologically Relevant Oxidizing Species", antioxidants, vol. 8, No. 48, pp. 1-23, Feb. 22, 2019.

Sucher et al., "Indoleamine 2,3-dioxygenase (IDO) and Treg Support are Critical for CTLA4Ig- Mediated Long-term Solid Organ Allograft Survival", Journal of Immunology, vol. 188, No. 1, pp. 37-46, Jan. 1, 2012.

Kudo, "The role of placental indoleamine 2,3-dioxygenase in human pregnancy", Obstet Gynecol Sci, vol. 56, No. 4, pp. 209-216, 2013.

METHOD AND COMPOUNDS FOR TREATING OR PREVENTING AUTOIMMUNE DISORDERS OR IMMUNE RESPONSES MODULATED BY THE EXPRESSION OF IDO1

CROSS-REFERENCE TO RELATED APPLICATIONS

This application claims priority to U.S. Provisional Patent Application No. 62/872,303, filed Jul. 10, 2019, which is hereby incorporated in its entirety by reference.

STATEMENT REGARDING FEDERALLY SPONSORED RESEARCH OR DEVELOPMENT

This invention was made with government support under Grant No. GM036298 awarded by the National Institutes of Health. The government has certain rights in the invention.

TECHNOLOGICAL FIELD

This application is drawn to the treatment of autoimmune diseases, and particularly to a method for treating autoimmune diseases that are modulated by the expression of IDO1, and also novel agonists of IDO1.

BACKGROUND

Indoleamine 2,3-dioxygenase (IDO1) is a heme enzyme that catalyzes the dioxygenation of the indole ring of tryptophan and similar substrates such as melatonin, serotonin, and tryptamine. IDO1, along with the paralogous indoleamine 2,3-dioxygenase-2 and tryptophan dioxygenase, oxidizes tryptophan to N-formylkynurenine in the first committed step of the kynurenine pathway that leads to the synthesis of the nicotinamide adenine dinucleotide cofactor. The vast majority of tryptophan, an essential and energetically expensive amino acid, is catabolized through this pathway.

The mechanism of IDO1 is considered to entail oxygen-binding to the ferrous enzyme to form the ferric-superoxide complex. This species is proposed to directly engage with the indole ring of its substrates via an alkylperoxo-iron(III) intermediate to form an indole epoxide and ferryl intermediates, both of which have been observed. Recombination of these fragments leads to oxidative scission of the indole ring and regeneration of the enzyme in the active ferrous state.

The oxidation of tryptophan through IDO1 activity is central to immune regulation, providing a necessary brake to prevent autoimmunity and damaging inflammation. IDO1 is expressed in many tissues, but it is highly upregulated in response to infection signaled by the cytokine interferon-γ and lipopolysaccharides. By depleting tryptophan from the local tissue environment, IDO1 stalls the proliferation of invading pathogens as well as immune cells. The resultant production of kynurenine metabolites causes similar effects by triggering cell cycle arrest and promoting the generation of immune suppressing T-regulatory cells.

Immunosuppression by IDO1 was discovered when it was found that IDO1 is essential for fetal tissue to survive the maternal immune response. The remarkable ability of IDO1 to induce immune tolerance is also utilized by cancer cells, many of which demonstrate high expression of IDO1 that correlates with poor prognoses. Accordingly, intense efforts have been made to find inhibitors of IDO1 to restore normal immune clearance of cancer cells. Alternatively, the down-regulation of IDO1 activity potentiates many autoimmune disorders, including rheumatoid arthritis, type I diabetes, multiple sclerosis, and inflammation leading to cardiovascular disease. Activation of IDO1 is thus likely to have similarly far-reaching effects in health as its inhibition, but this aspect of IDO1 regulation has only just begun to be explored. No specific activator of tryptophan oxidation by IDO1 have been reported to date.

BRIEF SUMMARY

A first aspect of the present disclosure is drawn to a method for treating or preventing an auto-immune disorder or immune response in a patient. The method generally requires providing a therapeutic dose to the patient of a substituted indole compound having at least one substitution, wherein the substituted indole compound has only one thiol group, and wherein the ring the thiol group is attached to only contains one N or O atom.

Optionally, the substituted indole compound may comprise a compound having the chemical structure (I):

or a pharmaceutically acceptable salt, solvate, clathrate, hydrate or prodrug thereof, where $R^1$ is H, a halogen, or CN; $R^2$ is H, a halogen, $NH_2$, or CN; $R^3$ is H or CN; $R^4$ is H or a thiol protecting group; and at least one of $R^1$, $R^2$, or $R^3$ is a halogen, $NH_2$, or CN.

In some embodiments, the substituted indole compound is 1H-indole-3-thiol, 6-fluoro-1H-indole-3-thiol, 5-bromo-1H-indole-3-thiol, 5-fluoro-6-chloro-1H-indole-3-thiol, 6-cyano-1H-indole-3-thiol, 5-cyano-1H-indole-3-thiol, 4-cyano-1H-indole-3-thiol, or 5-amino-1H-indole-3-thiol.

In some embodiments, the substituted indole compound does not comprise a halogen and/or directly ligates to the iron atom in the IDO1 heme-cofactor.

In some embodiments, the substituted indole compound activates an indoleamine 2,3-dioxygenase (IDO1) enzyme. In such cases, optionally, the method also includes regenerating the substituted indole compound by reacting with glutathione. In some cases, the substituted indole compound further activates at least one additional IDO1 enzyme.

In some embodiments, the therapeutic dose comprises the substituted indole compound, glutathione, and a pharmaceutically acceptable buffer. In some embodiments, the auto-immune disorder or immune response is a maternal rejection of fetal tissue, or a rejection of transplanted tissues.

A second aspect of the present disclosure is drawn to a composition of matter, a specific subset of the substituted indole compounds, that have chemical structure (II):

or a pharmaceutically acceptable salt, solvate, clathrate, hydrate or prodrug thereof, where X and X' are independently F, Cl, or Br, and R is H or a thiol protecting group. In some embodiments, the composition has a molecule weight between 100 g/mol and 250 g/mol.

In some embodiments, X is F and X' is Cl. In some embodiments, the thiol protecting group is selected so as to form a thioester, thiocarbonate, or thiocarbamate.

In some embodiments, the chemical structure is attached to a pharmaceutically acceptable carrier via a disulfide bond.

DETAILED DESCRIPTION

The cellular regulation of IDO1 is unsurprisingly intricate. At the post-translational level alone, IDO1 activity is affected by phosphorylation, ubiquitination, nitration, nitrosylation, allosteric binding of small molecules, and the dynamic binding of its heme cofactor. The redox state of the enzyme provides yet another important level of control. To bind molecular oxygen and activate tryptophan, IDO1 must be in the reduced ferrous state, where it returns in its catalytic cycle without the need for additional reducing equivalents. And yet, if no reductant is supplied during multiple turnovers, IDO1 undergoes abortive autoxidation with loss of superoxide to produce the inactive ferric enzyme. The ferric IDO1 produced in this manner persists even in the reducing environment of cells, suggesting that self-limiting autoxidation is an adaption to prevent excessive activity. Further highlighting the importance of redox regulation in tryptophan metabolism, inactive ferric IDO1 is also prone to long-term inactivation through heme loss, which likely accounts for the majority of cellular IDO1 found in the apo-form.

Here, it is shown that hydrogen sulfide and, to a much greater extent, polysulfides, bind to IDO1 and reduce it to the active ferrous state, linking the immune response in a novel way to sulfide signaling. It is shown that small-molecule thiols, such as 3-mercaptoindole, replicate these effects, indicating a new class of selecting IDO1-reducing agonists.

A method for treating or preventing autoimmune diseases in a patient that are modulated by the expression of IDO1 is disclosed. In some embodiments, only specific auto-immune disorders or immune responses are treated. An autoimmune disorder is a condition that occurs when the immune system mistakenly attacks and destroys healthy body tissue. There are more than 80 different types of autoimmune disorders. Normally the immune system's white blood cells help protect the body from harmful substances, called antigens. Examples of antigens include bacteria, viruses, toxins, cancer cells, and blood or tissues from another person or species. The immune system produces antibodies that destroy these harmful substances. However, in patients with an autoimmune disorder, the immune system cannot distinguish between self and non-self (e.g., healthy tissue and foreign antigens). The result is an immune response that destroys normal body tissues. This response is a hypersensitivity reaction similar to the response in allergic conditions.

Autoimmune diseases that could potentially be treated with this method include Achalasia, Addison's disease, Adult Still's disease, Agammaglobulinemia, Alopecia areata, Amyloidosis, Ankylosing spondylitis, Anti-GBM/Anti-TBM nephritis, Antiphospholipid syndrome, Autoimmune angioedema, Autoimmune dysautonomia, Autoimmune encephalomyelitis, Autoimmune hepatitis, Autoimmune inner ear disease (AIED), Autoimmune myocarditis, Autoimmune oophoritis, Autoimmune orchitis, Autoimmune pancreatitis, Autoimmune retinopathy, Autoimmune urticaria, Axonal & neuronal neuropathy (AMAN), Baló disease, Behcet's disease, Benign mucosal pemphigoid, Bullous pemphigoid, Castleman disease (CD), Celiac disease, Chagas disease, Chronic inflammatory demyelinating polyneuropathy (CIDP), Chronic recurrent multifocal osteomyelitis (CRMO), Churg-Strauss Syndrome (CSS) or Eosinophilic Granulomatosis (EGPA), Cicatricial pemphigoid, Cogan's syndrome, Cold agglutinin disease, Congenital heart block, Coxsackie myocarditis, CREST syndrome, Crohn's disease, Dermatitis herpetiformis, Dermatomyositis, Devic's disease (neuromyelitis optica), Discoid lupus, Dressler's syndrome, Endometriosis, Eosinophilic esophagitis (EoE), Eosinophilic fasciitis, Erythema nodosum, Essential mixed cryoglobulinemia, Evans syndrome, Fibromyalgia, Fibrosing alveolitis, Giant cell arteritis (temporal arteritis), Giant cell myocarditis, Glomerulonephritis, Goodpasture's syndrome, Granulomatosis with Polyangiitis, Graves' disease, Guillain-Barre syndrome, Hashimoto's thyroiditis, Hemolytic anemia, Henoch-Schonlein purpura (HSP), Herpes gestationis or pemphigoid gestationis (PG), Hidradenitis Suppurativa (HS) (Acne Inversa), Hypogammalglobulinemia, IgA Nephropathy, IgG4-related sclerosing disease, Immune thrombocytopenic purpura (ITP), Inclusion body myositis (IBM), Interstitial cystitis (IC), Juvenile arthritis, Juvenile diabetes (Type 1 diabetes), Juvenile myositis (JM), Kawasaki disease, Lambert-Eaton syndrome, Leukocytoclastic vasculitis, Lichen planus, Lichen sclerosus, Ligneous conjunctivitis, Linear IgA disease (LAD), Lupus, Lyme disease chronic, Meniere's disease, Microscopic polyangiitis (MPA), Mixed connective tissue disease (MCTD), Mooren's ulcer, Mucha-Habermann disease, Multifocal Motor Neuropathy (MMN) or MMNCB, Multiple sclerosis, Myasthenia gravis, Myositis, Narcolepsy, Neonatal Lupus, Neuromyelitis optica, Neutropenia, Ocular cicatricial pemphigoid, Optic neuritis, Palindromic rheumatism (PR), PANDAS, Paraneoplastic cerebellar degeneration (PCD), Paroxysmal nocturnal hemoglobinuria (PNH), Parry Romberg syndrome, Pars planitis (peripheral uveitis), Parsonage-Turner syndrome, Pemphigus, Peripheral neuropathy, Perivenous encephalomyelitis, Pernicious anemia (PA), POEMS syndrome, Polyarteritis nodosa, Polyglandular syndromes type I, II, III, Polymyalgia rheumatica, Polymyositis, Postmyocardial infarction syndrome, Postpericardiotomy syndrome, Primary biliary cirrhosis, Primary sclerosing cholangitis, Progesterone dermatitis, Psoriasis, Psoriatic arthritis, Pure red cell aplasia (PRCA), Pyoderma gangrenosum, Raynaud's phenomenon, Reactive Arthritis, Reflex sympathetic dystrophy, Relapsing polychondritis, Restless legs syndrome (RLS), Retroperitoneal fibrosis, Rheumatic fever, Rheumatoid arthritis, Sarcoidosis, Schmidt syndrome, Scleritis, Scleroderma, Sjögren's syndrome, Sperm & testicular autoimmunity, Stiff person syndrome (SPS), Subacute bacterial endocarditis (SBE), Susac's syndrome, Sympathetic ophthalmia (SO), Takayasu's arteritis, Temporal arteritis/Giant cell arteritis, Thrombocytopenic purpura (TTP), Thyroid eye disease (TED), Tolosa-Hunt syndrome (THS), Transverse myelitis, Type 1 diabetes, Ulcerative colitis (UC), Undifferentiated connective tissue disease (UCTD), Uveitis, Vasculitis, Vitiligo, and Vogt-Koyanagi-Harada Disease.

More particularly, in some embodiments the method is used to treat an auto-immune disorder or immune response that is either a maternal rejection of fetal tissue, or a rejection of transplanted tissues.

The method involves providing a therapeutic dose to the patient of a substituted indole compound having at least one substitution, wherein the substituted indole compound has only one thiol group, and wherein the ring the thiol group is attached to only contains one N or O atom.

In certain embodiments, the substituted indole compound comprises a compound having the chemical structure (I):

(I)

or a pharmaceutically acceptable salt, solvate, clathrate, hydrate or prodrug thereof, where $R^1$ is H, a halogen, or CN; $R^2$ is H, a halogen, $NH_2$, or CN; $R^3$ is H or CN; $R^4$ is H or a thiol protecting group; and at least one of $R^1$, $R^2$, or $R^3$ is a halogen, $NH_2$, or CN.

Chemical structure (I) may be attached to a pharmaceutically acceptable carrier via a disulfide bond. The carrier may be any appropriate carrier type, including liposomes, polymeric micelles, microstructures, nanostructures, nanofibers, protein-drug conjugates, erythrocytes, virosomes, or dendrimers.

Said differently, the thiol protecting group, $R^4$, could be any pharmaceutically acceptable carrier, allowing for reduction to the active substituted thiol in the reducing environment of the cell. This can include protecting the substituted indole thiol via disulfide bonds to a second substituted thioindole creating a dimer or to any appropriate thiol bearing small molecule creating an asymmetric disulfide. This may also include protection via disulfide bonds to small molecules that aid in the cellular uptake of the prodrug wherein the thiol is protected through disulfide bonds to amino acids such as cysteine or sugar moieties connected via an ester to an alkyl thiol. See, e.g., Akam, et al., Targeting iron in colon cancer via glycoconjugation of thiosemicarbazone prochelators. Bioconjugate Chem. 2016, 27 (8), 1807-1812, which is incorporated by reference herein in its entirety. In some embodiments, the substituted indole compound can have the following structures:

Preferably, the substituted indole compound is 1H-indole-3-thiol, 6-fluoro-1H-indole-3-thiol, 5-bromo-1H-indole-3-thiol, 5-fluoro-6-chloro-1H-indole-3-thiol, 6-cyano-1H-indole-3-thiol, 5-cyano-1H-indole-3-thiol, 4-cyano-1H-indole-3-thiol, or 5-amino-1H-indole-3-thiol.

Any thiol protecting group may be used. A thiol protecting group is any moiety that prevents or prevents a thiol functional group that is chemically reactive under certain conditions in a molecule from reacting. Typical thiol protecting groups are selected so as to form thioethers, thioesters, thiocarbonates, thiocarbamates, or disulfides. In certain embodiments, the thiol protecting group is selected so as to form a thioester, thiocarbonate, or thiocarbamate. Some specific thiol protecting groups include, but are not limited to: ($C_1$-$C_4$) alkylcarbonyl; ($C_1$-$C_4$) alkylthiocarbonyl; ($C_1$-$C_4$) alkoxycarbonyl; ($C_1$-$C_4$) alkoxythiocarbonyl; ($C_1$-$C_4$) alkylthiothiocarbonyl; (Di) ($C_1$-$C_4$) (alkyl) aminocarbonyl; (Di) ($C_1$-$C_4$) (alkyl) aminothiocarbonyl; Arylcarbonyl, such as phenylcarbonyl; Aryl ($C_1$-$C_4$) alkoxycarbonyl; (Di) ($C_1$-$C_4$) (alkyl) aminocarbonyl, such as dimethylaminocarbonyl; ($C_1$-$C_4$) (alkyl) arylaminocarbonyl; $SO_3^{-}$; $M^+$ (where $M^+$ represents an alkali metal such as sodium or potassium; and optionally substituted aryl (such as phenyl, dibenzosuberyl or 1,3,5-cycloheptatrienyl).

In some embodiments, the substituted indole compound does not comprise a halogen. In some embodiments, the substituted indole compound comprises only 1 halogen. In some embodiments, the substituted indole compound comprises only 2 halogens.

In preferred embodiments, the substituted indole compound comprises a compound having the chemical structure (II):

or a pharmaceutically acceptable salt, solvate, clathrate, hydrate or prodrug thereof, where X and X' are independently F, Cl, or Br, and R is H or a thiol protecting group.

In some embodiments, X and X' are different halogens. For example, in a preferred embodiment, X is F and X' is Cl. As noted above, chemical structure (II) may be attached to a pharmaceutically acceptable carrier via a disulfide bond.

In preferred embodiments, the substituted indole compound having the chemical structure (II) has a molecule weight between 100 g/mol and 250 g/mol.

The therapeutic dose may comprise other components. For example, in some embodiments, the therapeutic dose comprises, consists essentially of, or consists of, the substituted indole compound, one or more antioxidants (preferably only antioxidants normally produced by the patient, such as glutathione), and a pharmaceutically acceptable buffer.

In some embodiments, the substituted indole compound is configured to directly ligate to the iron atom in the IDO1 heme-cofactor.

Preferably, the substituted indole compound only activates an indoleamine 2,3-dioxygenase (IDO1) enzyme. In some embodiments, however, the substituted indole compound further activates at least one additional IDO1 enzyme.

Example 1

Synthesis of 3-Mercaptoindole (3MI) Analogues from Substituted Indole Rings

The C-3 sulfur-substituted indole has been readily synthesized from indole pre-cursors since the 1980s (Nagarajan, et al., "Derivatives of 3-Mercaptoindole-Synthesis of a Potent Vasoconstrictor, 3-(2-Imidazolin-2-ylthio)indole (Tinazoline)", Indian J. Chem. 20, 672-679 (1981)) and can be done as a one-step synthesis with thiourea and two subsequent work-up steps. A theoretical mechanism with iodine-mediated nucleophilic aromatic substitution of thiourea is straightforward, using Nagarajan as background. In this example, all 3MI analogues had substituted indoles commercially available.

Optimization tests revealed that the most preferred conditions: the long initial incubation (r.t., 2 h 30 min) followed by the shorter but hotter free-basing step (100° C., 15 min) and very acidic neutralization (r.t., pH 1) gave the best conversion and yield. Also, the ratio of thiourea to substituted indole was reduced to such that the standard mixture is now 0.04 M indole, 0.4 M thiourea, 2.8 M I2, and 3.6 M KI.

A batch of each substrate was synthesized: 0.04 M of the desired indole ring was incubated with 0.4 M of thiourea, 2.8 M of iodine, and 3.6 M of potassium iodide in methanol and stirring (~22° C., 2 hrs and 30 min) before evaporating the solvent under vacuum and washing the resulting iodide salt with water and ether. The salt was then mixed in methylene chloride and 10% aqueous sodium hydroxide (100° C., 15 minutes) to create the free base which was filtered from remaining solids (S-S'-bis compounds) and the filtrate acidified with pH 1 HCl to create the desired mercaptoindole.

Preliminary mass spectroscopy showed that the unpurified reaction mixture contained reactants, product, and off-target compounds. Due to the similarity of the starting indole and the thiol-substituted product, there was little polarity distinction to separate the mixture. Thus, a two-step purification using a CombiFlash Rf 200 to first elute the indoles together while removing off-target products and then as a second purification finely separate the product from the reactant was chosen. For both steps, the primary solvent was hexanes with additions of ethyl acetate between zero and ten percent (Table I, below).

TABLE I

| Step | Ethyl Acetate (%) | Change (min) | Duration (min) |
|---|---|---|---|
| First "Rough" Purification | | | |
| 1 | 0 | N/A | 3 |
| 2 | 5 | 1 | 30 |
| 3 | 10 | 2 | 10 |
| Second "Fine" Purification | | | |
| 1 | 0 | N/A | 1 |
| 2 | 2.5 | 3 | 30 |
| 3 | 5 | 2 | 10 |

Example 2

Generic Scheme

The following general scheme, depicted graphically below, is a modification of the synthesis of 3-thiyl-indole, as reported by Nagarjan et al., "Derivatives of 3-Mercaptoindole-Synthesis of a Potent Vasoconstrictor, 3-(2-Imidazolin-2-ylthio)indole (Tinazoline)". Indian J. Chem. 20, 672-679 (1981).

Unthiolated indole variants were mixed with thiourea in a suitable solvent such as methanol, and to this was added a solution of potassium iodide and iodine in water. This solution was stirred for an appropriate time (around 2.5 h) and temperature (around 22° C.). The resultant solution was placed under vacuum to remove most methanol, after which the solid product was filtered and washed with water and ether.

The filtered solid product was dissolved in an appropriate solvent such as methylene chloride and mixed with an appropriate base such as 10% sodium hydroxide in water, and solution was refluxed for an appropriate time and elevated temperature, such as around 2 hours and placed at 50° C. under reflux. The solution was then filtered to remove solid product dimers formed through disulfide bond. The filtrate was slowly acidified through addition of an acid such as 10% aqueous hydrogen chloride to precipitate the product, which was then filtered and washed with water.

Example 3

6-Chloro-5-Fluoro-1H-Indole-3-Thiol

In this example, as implied by the scheme below, a solution of thiourea (304 mg; 4 mmol), iodine (825 mg; 6.5 mmol) and potassium iodide (1.41 g; 8.5 mmol) was dissolved in a mixture of 4 mL methanol and 2.5 mL water. To this was added a solution of 6-chloro-5-fluoro-indole (19.9 mg; 0.114 mmol) dissolved in 3.5 mL of methanol in 50 µL aliquots over 2 hours at room temp, after which the solution was stored 16 hours in the dark at 4° C. The methanol was removed by rotary evaporation, and the solid product was filtered. The filter with product was directly added to a small vial with 1 mL dichloromethane and 0.3 mL 10% (w/v) NaOH where it was allowed to react for 2 hours at 80° C. The dichloromethane was then removed with rotary evaporation. To the resultant solution was added 5% HCl until the solution reached pH 1.0 (1.2 mL 5% HCl). A white solid precipitated, which was separated from the solution with centrifugation in 1.5 mL Eppendorf tube. $(M+H)^+$ =201.98133.

Chemical Formula: $C_8H_5ClFN$
Exact Mass: 169.0095

Chemical Formula: $C_8H_5ClFNS$
Exact Mass: 200.9815

Figure 6:
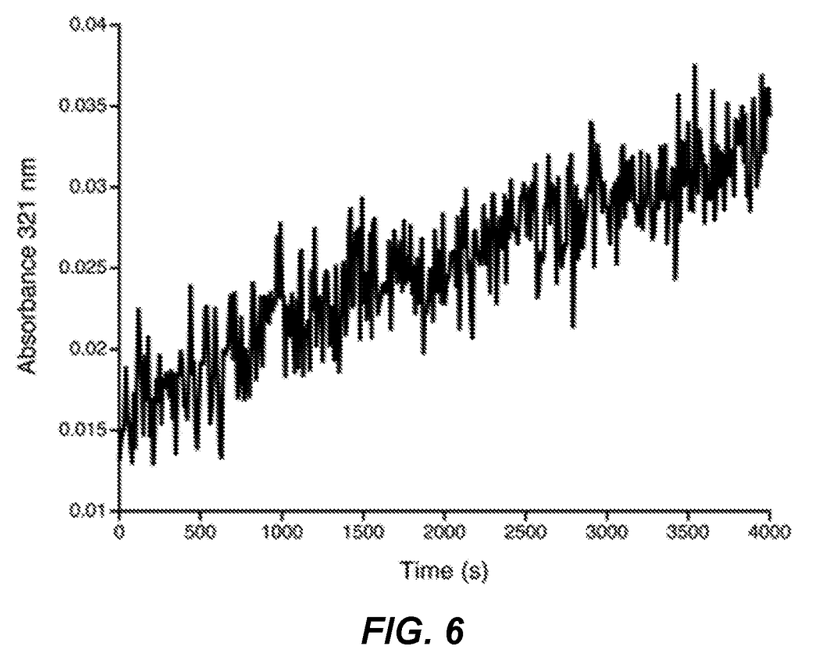
FIG. 6 is a graph showing the increase in activity indicated by the increase in absorbance over time in the product N-formylkynurenine absorbance at 321 nm (with background absorbance subtracted from a sample lacking added 6-chloro-5-fluoro-1H-indole-3-thiol).

FIG. 6 reflects a system involving IDO1 (50 nM), 0.1 mM L-tryptophan, and 5 mM glutathione in 100 mM sodium phosphate, pH 7.0 with <1 µM 6-chloro-5-fluoro-1H-indole-3-thiol. As seen by the overall upward trend in FIG. 6, the activity of 6-chloro-5-fluoro-1H-indole-3-thiol is shown by an increase in absorbance in the product N-formylkynurenine absorbance at 321 nm (with background absorbance subtracted from a sample lacking added 6-chloro-5-fluoro-1H-indole-3-thiol).

In some embodiments, the method may also comprise regenerating the substituted indole compound by reacting with the one or more antioxidants, which preferably includes glutathione. Other pharmaceutically acceptable antioxidants include, without limitation, sodium metabisulfite, sodium thiosulfate, acetylcysteine, butylated hydroxyanisole and butylated hydroxytoluene.

In some embodiments, the therapeutic dose provided to the patient comprises, consists essentially of, or consists of the substituted indole compound, and a buffer (preferably a pharmaceutically acceptable buffer). In some embodiments, the therapeutic dose provided to the patient comprises, consists essentially of, or consists of the substituted indole compound, a buffer (preferably a pharmaceutically acceptable buffer), and a preservative (preferably a pharmaceutically acceptable preservative). In some embodiments, the therapeutic dose may optionally include one or more antioxidants (preferably glutathione).

A pharmaceutically acceptable buffer is any buffer that can be used to prepare a pharmaceutical composition disclosed in the present specification, provided that the resulting preparation is pharmaceutically acceptable. Non-limiting examples of pharmaceutically acceptable buffers include, but are not limited to, acetate buffers, borate buffers, citrate buffers, neutral buffered salines, phosphate buffers, and phosphate buffered salines. Any concentration of a pharmaceutically acceptable buffer can be useful in formulating a pharmaceutical composition disclosed in the present specification. Non-limiting examples of concentrations of physiologically-acceptable buffers occur within the range of about 0.1 mM to about 900 mM. The pH of pharmaceutically acceptable buffers may be adjusted. It is understood that acids or bases can be used to adjust the pH of a pharmaceutical composition as needed. Any buffered pH level can be useful in formulating a pharmaceutical composition. Non-limiting examples of physiologically-acceptable pH occur within the range of about pH 5.5 to about pH 8.5.

In some embodiments the therapeutic dose also comprises a preservative. Pharmaceutically acceptable preservatives include, without limitation, benzalkonium chloride, chlorobutanol, thimerosal, phenylmercuric acetate, phenylmercuric nitrate, and chelants, such as, e.g., DTPA or DTPA-bisamide, calcium DTPA, and CaNaDTPA-bisamide.

Any suitable route of administration may be employed for providing a mammal, especially a human, with an effective dose of a compound of the present invention. For example, oral, rectal, topical, parenteral, ocular, pulmonary, nasal, intravenous, and the like may be employed. Dosage forms include tablets, troches, dispersions, suspensions, solutions, capsules, creams, ointments, aerosols, and the like. Preferably compounds of the present invention are administered orally.

In the treatment or prevention of conditions which can be controlled through the modulation of IDO1 activity, an appropriate dosage level will generally be about 0.01 to 500 mg per kg patient body weight per day which can be administered in single or multiple doses. Preferably, the dosage level will be about 0.1 to about 250 mg/kg per day; more preferably about 0.5 to about 100 mg/kg per day. A suitable dosage level may be about 0.01 to 250 mg/kg per day, about 0.05 to 100 mg/kg per day, or about 0.1 to 50 mg/kg per day. Within this range the dosage may be 0.05 to 0.5, 0.5 to 5 or 5 to 50 mg/kg per day. For oral administration, the compositions are preferably provided in the form of tablets containing 1.0 to 1000 mg of the active ingredient, particularly 1.0, 5.0, 10.0, 15.0, 20.0, 25.0, 50.0, 75.0, 100.0, 150.0, 200.0, 250.0, 300.0, 400.0, 500.0, 600.0, 750.0, 800.0, 900.0, and 1000.0 mg of the active ingredient for the symptomatic adjustment of the dosage to the patient to be treated. The compounds may be administered on a regimen of 1, 2, 3, 4, 5 or 6 times per day, preferably 1, 2, 3, or 4 times a day, more preferably once or twice per day. The compounds may be administered for 1 day to 28 days, or longer until the bacterial infection is treated or prevented.

The compounds of the present invention may be administered intravenously as shots or vaccinations. Intravenous administration of a compound of the present invention can be conducted by reconstituting a powdered form of the compounds with an acceptable solvent. Suitable solvents include, for example, saline solutions (e.g. 90% sodium chloride injection) and sterile water (e.g. Sterile Water for Injection, Bacteriostatic Water for Injection with methylparaben and propylparaben). The powdered form of the compound can be obtained by lyophilization of a solution of the compound, after which the powder can be stored (e.g. in a sealed vial) at or below room temperature until it is reconstituted. The concentration of the compound in the reconstituted IV solution can be, for example, in a range of from about 0.1 mg/mL to about 20 mg/mL.

For intravenous administration, the compositions are preferably provided in the form of an intravenous (IV) solution containing 1.0 to 1000 mg of the active ingredient, particularly 1.0, 5.0, 10.0, 15.0, 20.0, 25.0, 50.0, 75.0, 100.0, 150.0, 200.0, 250.0, 300.0, 400.0, 500.0, 600.0, 750.0, 800.0, 900.0, and 1000.0 mg of the active ingredient for the symptomatic adjustment of the dosage to the patient to be treated. The intravenous solution may be administered on a regimen of 1, 2, 3, 4, 5 or 6 times per day, preferably 1, 2, 3, or 4 times a day, more preferably once or twice per day. The compounds may be administered for 1 day to 28 days, or longer until the bacterial infection is treated or prevented.

Figure 1:
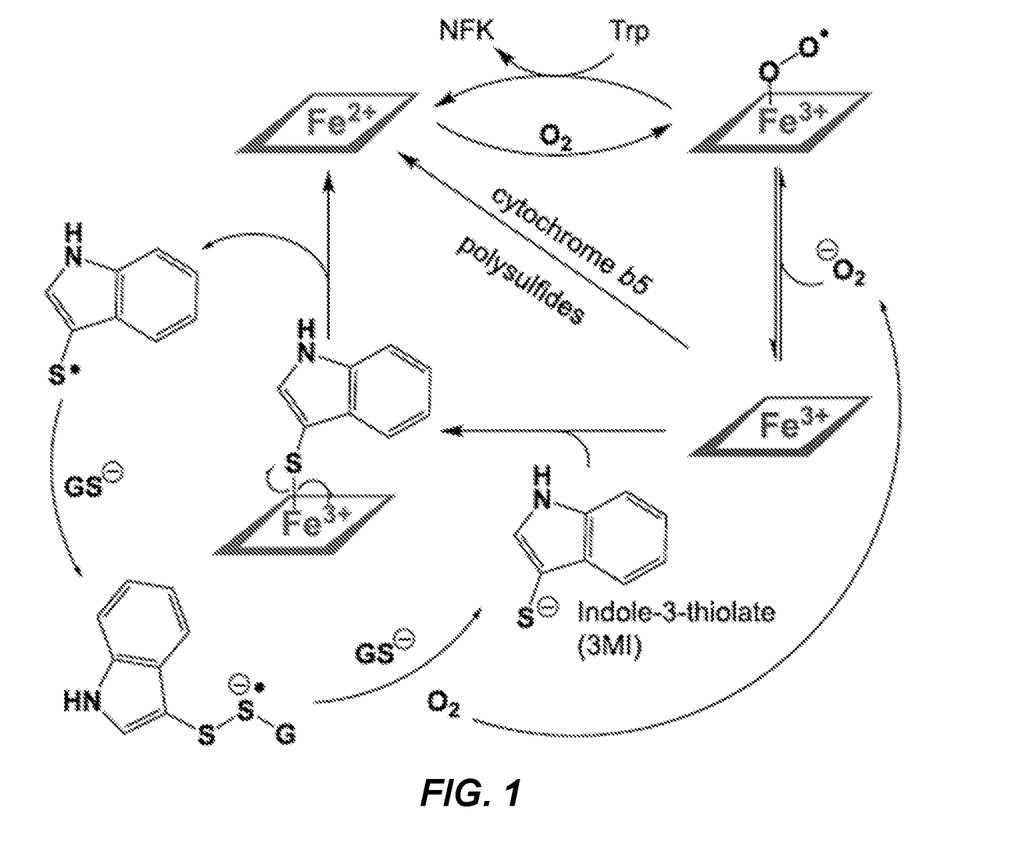
FIG. 1 is an illustration of a proposed mechanism of catalytic reduction of IDO1 by 3-mercaptoindole (3MI), whereby 3MI activates ferric IDO1 in a one-electron reduction, two molecules of glutathione thiolate (GS) and molecular oxygen regenerate the reduced anion of 3MI and a further IDO1-activating superoxide molecule.

Referring to FIG. 1, The disclosed substituted indole compounds, such as 3MI, activated IDO1 catalytically in the presence of glutathione (GSH). At low nM concentrations, the substituted indole compound was quickly depleted upon reaction with IDO1, but in the presence of cellularly relevant concentrations of GSH (~5 mM), the activating ability of the substituted indole compound was maintained over nearly an hour. See FIG. 2. This observation supports a mechanism wherein the oxidized product of, e.g., 3MI-activation of IDO1 is a 3MI-thiyl radical that can be recycled to the thiol by reacting with glutathione thiolate (present in the assay solution at 80 µM from 5 mM glutathione with a pKa 8.8 at pH 7.0). By comparison, sulfhydryl radical reacts at near diffusion-limited rates with thiolates (($4.0\pm0.6)\times10^8 M^{-1} s^{-1}$) at pH 7.0 to form a radical disulfide species that can then reduce oxygen to superoxide (($4.0\pm0.6)\times10^8 M^{-1} s^{-1}$) to afford the disulfide. In this way, the 3MI-thiyl radical can form an intermediate 3MI-GSH disulfide radical anion that would be expected to further react with oxygen to produce a mixed glutathione-3MI disulfide and superoxide. Superoxide itself is IDO1-activating, and the product 3MI-GSH disulfide can be reduced with another glutathione to free 3MI for additional rounds of IDO1-activation. (See FIG. 1)

The maximal turnover rate with some substituted indole compounds, e.g., 3MI, activating IDO1 (~0.16 s$^{-1}$) is lower than that achieved with polysulfides and ascorbate-methylene blue (1-2 s$^{-1}$). Since the activity of IDO1 in cells is known to be sensitive to the concentration of cytochrome $b_5$, it is likely that a significant portion of IDO1 exists in the inactive ferric form in vivo. Thus, the ability to maintain a constant IDO1 activity in cells could have pronounced effects perhaps even at turnover rates shown with, e.g., 3MI. This limitation in the activating ability of substituted indole compounds is likely to be caused by its side-reactivity with the intermediate, ferric-superoxo form of IDO1.

An attractive feature, however, is that the sustained activating ability of substituted indole compounds in the presence of glutathione shows that these secondary reactions are easily reversible, something that would not be the case if substituted indole compounds were oxygenated on its indole core. These substituted indole compounds may thus serve as the basis for a novel class of IDO1-activating agents. Remarkably, by reacting with both glutathione and IDO1, substituted indole compounds such as 3MI allows IDO1 to access the vast reducing power of the glutathione system in cells, holding it in the active state at low nM concentrations (See FIG. 1). This has a further benefit in that substituted indole compounds may be delivered to cells in the oxidized and less reactive disulfide form from which it can then be reduced to the active thiol in the reducing environment of the cytoplasm.

Example 3

3-Mercaptoindole Activates IDO1 Selectively

Figure 3:
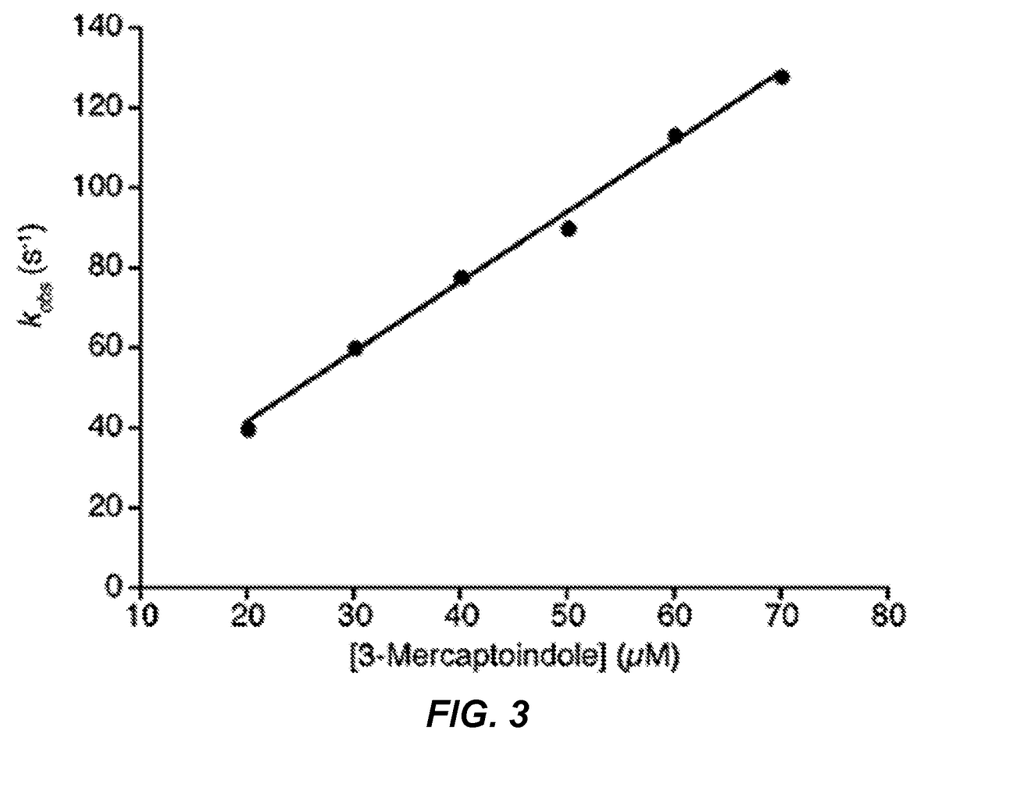
FIG. 3 is a graph showing the second-order rate constant of 3MI binding to ferric IDO1 determined by stopped-flow spectrometry.
Figure 4:
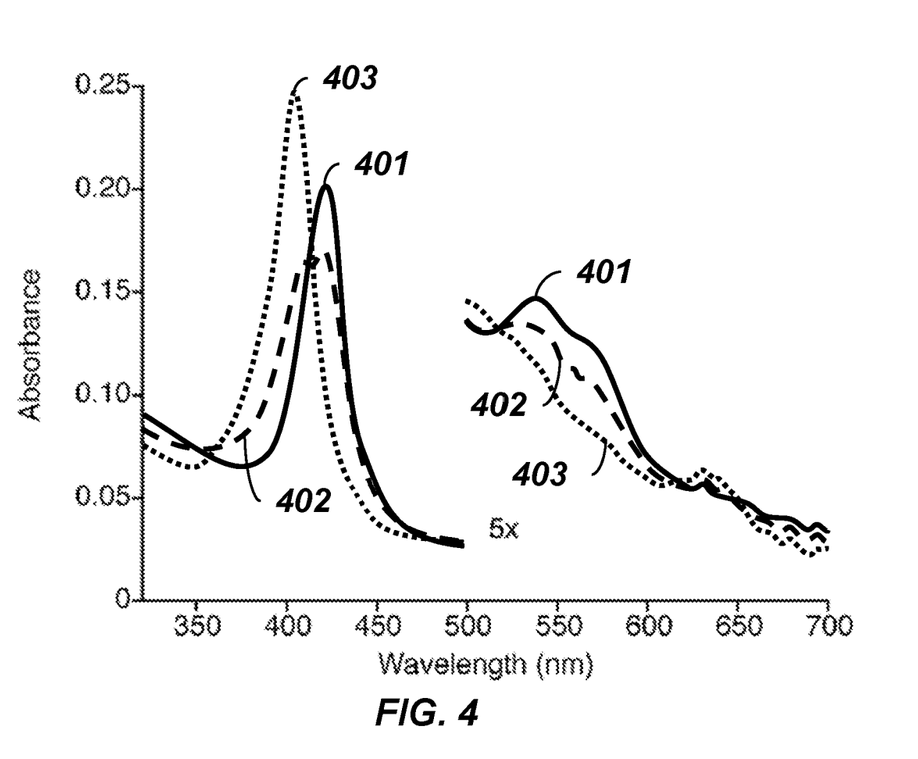
FIG. 4 is a graph showing stopped-flow UV—vis spectrometry of 3MI (30 μM) binding to IDO1 (1.4 μM) over 0.2 s.

The interaction of tryptophan in stabilizing hydrosulfido-IDO1 suggested that a small molecule that combines features of both tryptophan and hydrogen sulfide might be able to take advantage of both binding capabilities to produce an overall tighter binding affinity with IDO1. 3-Mercaptoindole (3MI) was seen to bind to IDO1 with a fast on-rate of $1.7\times10^6 M^{-1} s^{-1}$ under pseudo-first-order conditions (See FIG. 3), producing a UV—vis spectrum (see FIG. 4) that has a Soret at 424 nm, a lower peak at 321 nm, and broad q-bands at 537 nm and a shoulder at about 575 nm. Note that in the interest of readability, FIG. 4 only shows UV-vis spectrum for times of 202.5 ms (401), 19.8 ms (402), and 1.5 ms (403), although data was also captured at 4.5 ms, 7.6 ms, 13.7 ms, 25.9 ms, 38.0 ms, 50.2 ms, and 98.5 ms. Note that although 3MI is referred to here, similar results can be seen with other substituted indole compounds disclosed herein.

Figure 2:
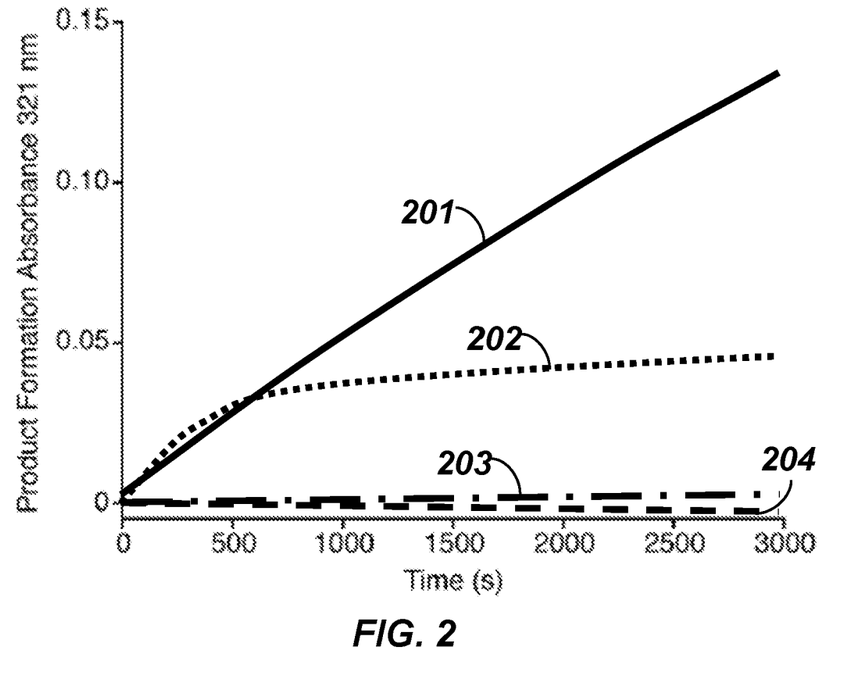
FIG. 2 is a graph showing the activity of IDO1 (500 nM) (204) with L-tryptophan (200 μM) as substrate glutathione alone (203), and also when activated by 3MI (500 nM) with glutathione (5 mM) (201), and by 3MI (500 nM) without glutathione (202).

The complete conversion to bound IDO1 at micromolar concentrations of 3MI also demonstrated this binding occurs with a submicromolar $K_d$. 3MI was additionally shown to activate IDO1, inducing turnover even at nM concentrations (See FIG. 2). Using 3MI, there was an initial burst of IDO1 activity, which leveled off after 500 s, well before substrate tryptophan was consumed (FIG. 2, 202). Reduced glutathione was added to the activity assay solutions at nearly cellular concentrations (5 mM) to reduce any oxidized 3MI-disulfide products that may have formed, and this allowed for sustained 3MI-induced IDO1 activity (FIG. 2, 201).

The $K_m$ of activation for 3MI was 2.2±0.7 µM, while $k_{cat}$ was determined to be 0.24±0.04 s$^{-1}$. The activity of the compounds was determined as follows. UV—vis spectra were recorded using a Hewlett-Packer 8453 diode array spectrophotometer. Activity assays were done at room temperature using 100 mM sodium phosphate, pH 7.0, with 500 nM IDO1 ($\varepsilon_{404\ nm}$=172 mM$^{-1}$ cm$^{-1}$) and 50 µM L-tryptophan. These were initiated by addition of IDO1, and activity was monitored at 321 nm where product N-formylkynurenine absorbs ($\varepsilon_{321\ nm}$=3750 M$^{-1}$ cm$^{-1}$).

The substituted indole compound was prepared daily in a 100 mM stock solution in dimethyl sulfoxide (DMSO), and this was serially diluted to maintain a consistent final concentration of 1% (v/v) DMSO in each assay. To maintain activity, 5 mM reduced glutathione was added to some of these from a 0.5 M stock solution. The substituted indole compound was generally tested from 100 nM to 10 µM. The ability of each compound to serve as a reducing substrate for IDO1 was fit using a Michaelis—Menten equation. The activity and inhibition caused by the substituted indole compounds did not fit well to a simple substrate inhibition expression and were instead fit at higher concentrations of the substituted indole compound using a single exponential equation to describe an apparent $K_i$ ($K_{i\ app}$) at half-activity derived similarly to a half-life. Above 5 µM 3MI, there was a steep inhibitory effect. The observed rate changes do not fit well to a simple substrate inhibition expression, and so a separate single exponential fit of the inhibitory region was used, showing a $K_{i\ app}$ of 8±3 µM.

Despite its activating ability, the substituted indole compounds did not cause the reduced ferrous form of IDO1 to accumulate. Under low-oxygenconditions, the substituted indole compound-IDO1 complex (such as a 3MI-IDO1 complex) formed and was quickly followed by the reappearance of the ferric enzyme. The substituted indole compound-bound species then reaccumulated over 500 s though to a lesser extent than in the initial burst. This overall process occurred more quickly when glutathione was added, producing a final substituted indole compound-IDO1 complex that was stable for at least 1500 s.

The nature of substituted indole compound-inhibition at high concentrations (>5 µM) was examined further with ferric-superoxo IDO1, the active tryptophan-oxidizing species. Ferric-superoxo IDO1 was generated using double-mixing stopped-flow spectrometry by mixing IDO1 prereduced with 2 mM sodium dithionite into aerobic buffer for 0.5 s. This ferric superoxo species was then mixed in the second push with 3MI that had been maintained in the reduced state using 5 mM glutathione. 3MI readily reacted with ferric-superoxo IDO1 to form ferric IDO1 without any observable intermediates. This was shown by a fast shift from the ferric-superoxo complex ($\lambda_{max}$ 415 nm) to the ferric ($\lambda_{max}$ 404 nm) that was completed nearly within the mixing time of the instrument (<10 ms) even at the lowest concentration of 3MI useful for pseudo-first-order reaction conditions (where 3MI must be at a large excess over IDO1). Following this fast conversion to ferric IDO1, there was a slower shift to the ferric 3MI-bound complex as indicated by the Soret shifting to 424 nm (as in FIG. 4). To account for both reactions, these traces were fit using a double exponential expression. The initial reaction of 3MI with ferric-superoxo IDO1 thus showed a fast second-order reaction with an estimated rate constant of >$10^7$ M$^{-1}$ s$^{-1}$.

Since hydrogen sulfide and polysulfides are known to react with other heme proteins, the selectivity of 3MI for IDO1 was examined by mixing the substituted indole compounds (such as 3MI) with several other heme proteins and observing their reactions using stopped-flow UV—vis spectrometry.

Figure 5:
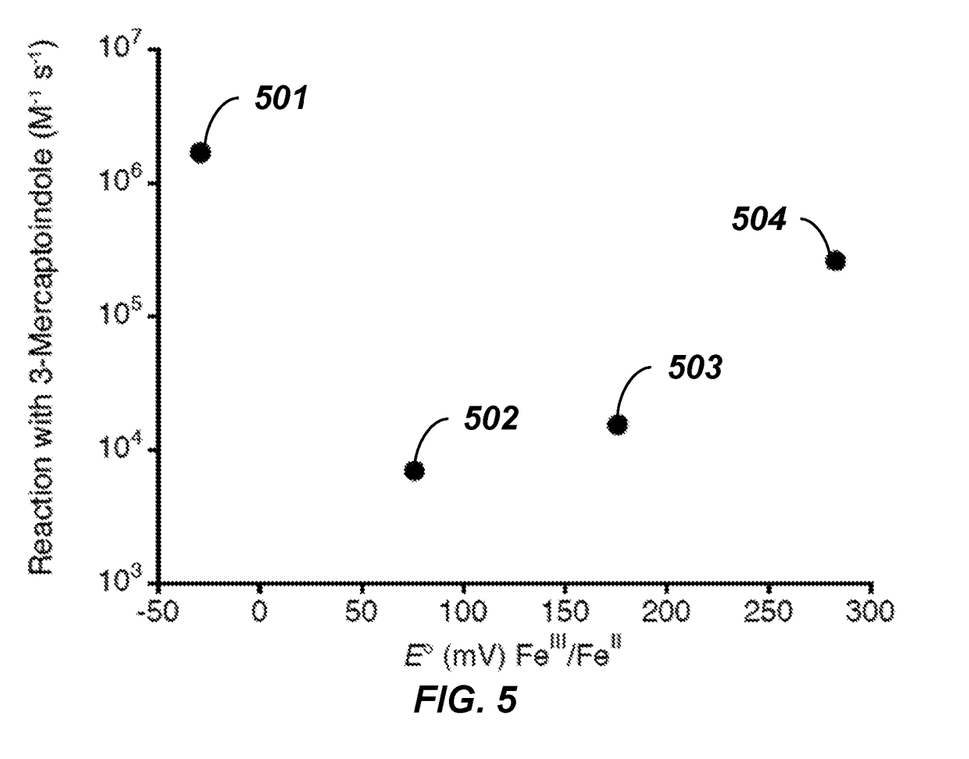
FIG. 5 is a graph showing the reaction rates for IDO1 (501), myoglobin (502), hemoglobin (503), and cytochrome c (504) plotted against their reported ferric/ferrous reduction potentials (the redox potentials are shown as potentials versus the standard hydrogen electrode).

The substituted indole compounds had no effect on catalase even at 250 µM, whereas the substituted indole compounds did appear to reduce myoglobin and hemoglobin, producing their oxygen-bound forms. The substituted indole compound were also able to reduce ferric cytochrome c to its distinctive ferrous form. The second-order rate constants of these reactions were determined under pseudo-first-order conditions giving 6.6×$10^3$, 1.6×$10^4$, and 2.7×$10^5$ M$^{-1}$ s$^{-1}$ for myoglobin, hemoglobin, and cytochrome c, respectively. Referring to FIG. 5, these rates showed a general trend increasing with the Fe$^{III}$/Fe$^{II}$ reduction potential. FIG. 5 shows reaction rates vs the Fe$^{III}$/Fe$^{II}$ reduction potential for IDO1 (501), myoglobin (502), hemoglobin (503), and cytochrome c (504). However, despite having the lowest reduction potential in this group, IDO1 reacted by binding to 3MI with a second-order rate constant of 1.7×$10^6$ M$^{-1}$ s$^{-1}$, exceeding that for the reduction reaction with the high potential cytochrome c by an order of magnitude, indicating selectivity of 3MI for IDO1. Unlike myoglobin and hemoglobin, the oxy-form of IDO1 was not observed due to the relatively slow reduction of IDO1 by 3MI.

The results show that substituted indole compounds will bind rapidly to ferric human IDO1 leading to the reduction of the heme cofactor and its activation toward oxygen-binding and tryptophan dioxygenation.

Those skilled in the art will recognize, or be able to ascertain using no more than routine experimentation, many equivalents to the specific embodiments of the invention described herein. Such equivalents are intended to be encompassed by the following claims

What is claimed is:

1. A method for treating an auto-immune disorder or immune response in a patient that is modulated by the expression of IDO1, comprising the steps of:
   upregulating the expression of IDO1 by providing a therapeutic dose to the patient of a substituted indole compound having at least one substitution, wherein the substituted indole compound has only one thiol group, and wherein the ring the thiol group is attached to only contains one N or O atom,
   wherein the substituted indole compound comprises a compound having the chemical structure (I)

(I)

or a pharmaceutically acceptable salt or prodrug thereof,
   wherein $R^1$ is H, a halogen, or CN; $R^2$ is H, a halogen, NH$_2$, or CN; $R^3$ is H or CN; $R^4$ is H or a thiol protecting group; and at least one of $R^1$, $R^2$, or $R^3$ is a halogen, NH$_2$, or CN.

2. The method according to claim 1 wherein the substituted indole compound is 1H-indole-3-thiol, 6-fluoro-1H-indole-3-thiol, 5-bromo-1H-indole-3-thiol, 5-fluoro-6-chloro-1H-indole-3-thiol, 6-cyano-1H-indole-3-thiol, 5-cyano-1H-indole-3-thiol, 4-cyano-1H-indole-3-thiol, or 5-amino-1H-indole-3-thiol.

3. The method according to claim 1, wherein the substituted indole compound does not comprise a halogen.

4. The method according to claim 1, wherein the substituted indole compound directly ligates to the iron atom in the IDO1 heme-cofactor.

5. The method according to claim 1, wherein the substituted indole compound activates an indoleamine 2,3-dioxygenase (IDO1) enzyme.

6. The method according to claim 5, further comprising regenerating the substituted indole compound by reacting with glutathione.

7. The method according to claim 5, wherein the substituted indole compound further activates at least one additional IDO1 enzyme.

8. The method according to claim 1, wherein the therapeutic dose comprises the substituted indole compound, glutathione, and a pharmaceutically acceptable buffer.

9. The method according to claim 1, wherein the auto-immune disorder or immune response is a maternal rejection of fetal tissue, or a rejection of transplanted tissues.

* * * * *